United States Patent [19]
Strange, Jr.

[11] Patent Number: 5,690,053
[45] Date of Patent: Nov. 25, 1997

[54] APPARATUS FOR SUSPENDING A REEF, REEF-BED, OR LIVE SAND FILTER, SINGULARLY OR IN COMBINATION, IN AN AQUARIUM

[76] Inventor: Frank A. Strange, Jr., 6871 Temperance Pt. St., Westerville, Ohio 43802

[21] Appl. No.: 761,944

[22] Filed: Dec. 9, 1996

[51] Int. Cl.$^6$ ............................................. A01K 63/00
[52] U.S. Cl. ............................................. 119/248
[58] Field of Search ........................... 119/245, 246, 119/247, 248, 251, 269; 211/188, 194, 187, 133; 108/110, 183, 186

[56] References Cited

U.S. PATENT DOCUMENTS

| | | | |
|---|---|---|---|
| 3,807,572 | 4/1974 | Luvara et al. | 108/110 X |
| 4,630,550 | 12/1986 | Wertzman | 108/186 X |
| 4,708,089 | 11/1987 | Goldman et al. | 119/248 |
| 4,993,362 | 2/1991 | Jimbo | 119/3 |
| 4,998,023 | 3/1991 | Kitts | 211/188 X |

OTHER PUBLICATIONS

How To Make A Live Sand Filter by Matthew Stevens in the Sep., 1996 issue of Aquarium on p. 190.
Nature of the Reef—More on Circulation byb Mike Binder in the Feb., 1996 issue of Marine Fish Monthly on pp. 13 and 20.

*Primary Examiner*—Thomas Price
*Attorney, Agent, or Firm*—Kremblas, Foster, Millard & Pollick; Sidney W. Millard

[57] ABSTRACT

An aquarium includes a shelving unit. The shelving unit rests on the bottom of the aquarium. The shelves are made of louvered eggcrate to allow water to freely circulate. A post supports each shelf. The shelf is joined to the post by a fitting, which has two tapered ends. All pieces are bonded together.

20 Claims, 5 Drawing Sheets

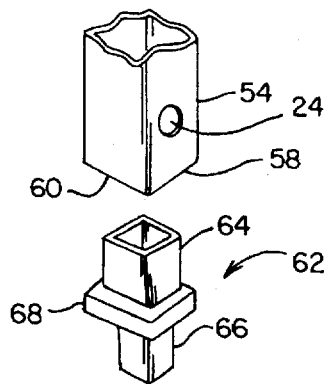
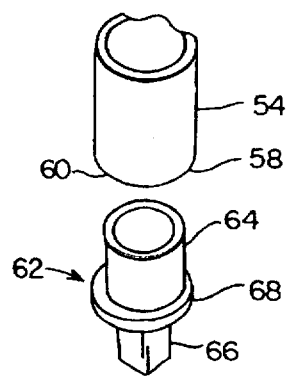
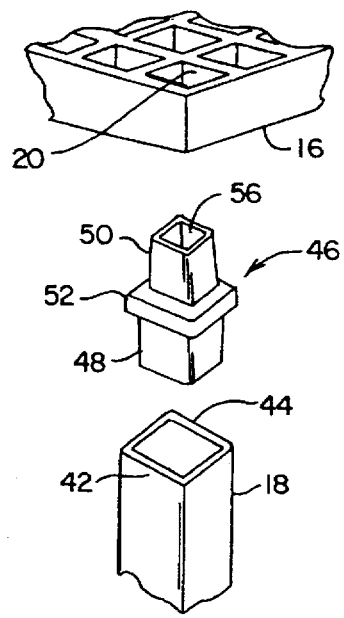
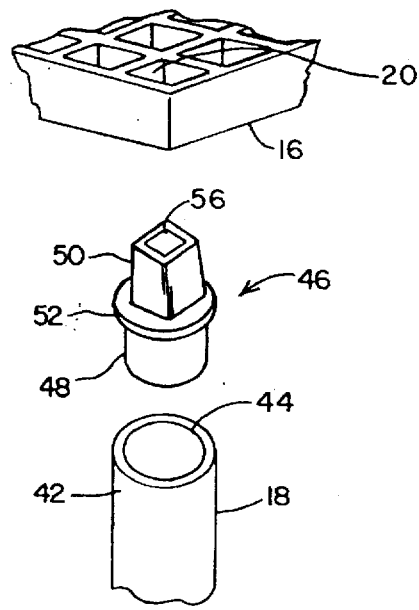
FIG. 5    FIG. 6
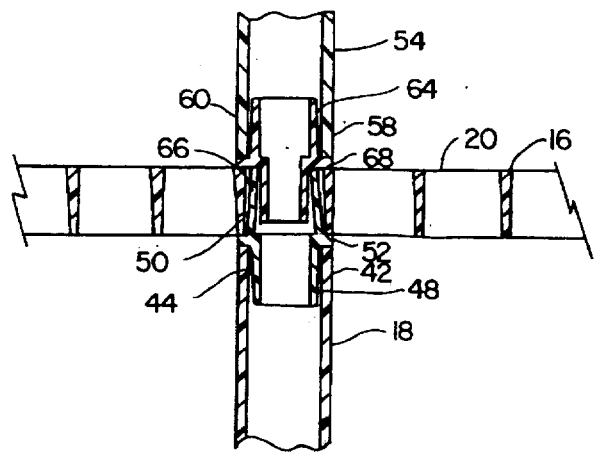
FIG. 7

APPARATUS FOR SUSPENDING A REEF, REEF-BED, OR LIVE SAND FILTER, SINGULARLY OR IN COMBINATION, IN AN AQUARIUM

FIELD OF THE INVENTION

This invention relates generally to an apparatus for suspending a reef, reef-bed, or live sand filter, singularly or in combination, in an aquarium and more particularly to a modular unit for creating a variety of shapes of suspended reefs which allow circulation of water through, around, over and under the reef.

BACKGROUND OF THE INVENTION

The creation of reefs in aquariums has been known since aquariums became popular and practical. Most reef structures, both past and present, involve piling rocks together and atop each other creating a mound of rocks rising from the bottom of the aquarium. The base of the mound is generally one half to two thirds the width of the aquarium bottom (back to front) and as long as the aquarium (left to right). The mound is widest at the aquarium bottom and slopes to the front of the aquarium from top to bottom. Reef structures of this type can easily occupy fifty percent or more of the available area of the aquarium.

The drawbacks of such a method are clear. A primary drawback of such a method is the lack of water circulation. Circulation is critical for a reef system to survive, thrive and proliferate, as well as allowing for higher levels of saturated oxygen to be distributed within the aquarium. Circulation is often confused with current, i.e., current being the strength of the water movement and circulation being the consistency of the water flow. Most reef animals and organisms prefer low to moderate current, yet moderate to high levels of circulation. The bulk of rocks used (base rock) in the method described above give height, width, and depth to the mound and are useless other than to support the outermost rocks of the mound which are of primary importance for colonization of beneficial animals and organisms. The bulk of the mound actually becomes detrimental to life on the surface of the mound as it inhibits circulation of oxygen rich water through the reef and traps detritus in the crevices of the mound. The bulk of rocks used in creating such a structure are costly both to the hobbyist and to life on the surface of the structure and provide virtually no circulation through or under the reef structure.

One example of an improved system is found in U.S. Pat. No. 4,993,362 to Jimbo. The patent to Jimbo discloses a base and a number of parallel supporting poles. Spacing members having a predetermined length are disposed on the supporting poles. A plate is then placed on the poles and spacing members. The plates are built up to the top of the supporting poles and a cap is placed on the top of the supporting pole. The pieces are made of concrete. The drawback of this invention is that there is little flexibility in the shape and size of the apparatus. The plates which form the levels of the Jimbo fish bed must be precision cut such that they will fit neatly on the supporting posts. Thus, the ability to create new shapes and sizes is diminished.

An article by Matthew Stevens in the September, 1996 issue of AQUARIUM discloses the use of an eggcrate material to create a live sand filter. However, in this case, any reef which is created involves piling rocks on top of the eggcrate material. The article discloses gluing lengths of P.V.C. pipe to the eggcrate surface to allow water passage below and through the eggcrate; however, in any other way this article shows a dissimilar item.

A February, 1996 article by Mike Bender in MARINE FISH MONTHLY discloses a more similar item. However, this reef is created by using pieces of P.V.C. pipe of large diameter (four inches) which are scattered along the eggcrate material to create the reef. This system has the drawback that circulation through the P.V.C. pipe is small and the pieces of pipe take up a good portion of area within the aquarium. In addition, this type of system will work well only with larger tanks because of the size of the pipe needed. The present invention solves many of these problems by creating a structure which allows for easy circulation of water throughout the reef and a smaller support post. Use of the smaller post permits use of this structure in smaller aquariums and circulation through the post is unnecessary because of their small size. In addition, the present structure allows any of a variety of shapes of reef to be used. Thus, the present invention allows greater flexibility to any aquarium user than has previously existed.

SUMMARY OF THE INVENTION

The present invention involves an aquarium which has a front, a back, sides, and a bottom joined together to form an enclosure to hold water. In the enclosure is at least one shelf and at least one post for holding the shelf horizontal. The post has a first end supported by the bottom of the aquarium and a second end extending to near the shelf. The shelf is made of louvered eggcrate to allow free circulation of water through the shelf, the eggcrate having a plurality of vertically extending square apertures. The shelf is joined to the post by a fitting which has two tapered ends. One of the ends extends into one of the square apertures and the other end projects into a recess in the second end of the post. The fitting is bonded to both the shelf and the post to form a rigid joint.

The aquarium may also include a second shelf of eggcrate material. If a second shelf is used, there will be a first post for supporting the shelf and a second post for supporting the second shelf. Each post has a first end which is supported by the bottom and a second end which extends to the respective shelf. The second shelf is joined to the second post by a second fitting which has two tapered ends. One of the ends extends into one of the square apertures of said second shelf. The other end projects into a recess in the second end of the second post. The fitting is bonded to both the second shelf and the second post is to form a rigid joint.

Alternatively, when a second shelf is used, the first post has a first end supported by the bottom and a second end which extends to near the first shelf. The second post extends from near the first shelf to near the second shelf. The first post is joined to the second post by a fitting which has two tapered ends. One of the ends extends into one of the square apertures of said first shelf. The other end projects into a recess in the second end of the first post. The fitting is bonded to both the shelf and the first post to form a rigid joint. The second post is joined to the first shelf by a fitting which has two tapered ends. One of the ends extends into one of the square apertures of said first shelf. The other end projects into a recess in the first end of the second post. The fitting is bonded to both the first shelf and the second post to form a rigid joint. The second shelf is joined to the second post by a fitting which has two tapered ends. One of the ends extends into one of the square apertures of said second shelf. The other end projects into a recess in the second end of the second post. The fitting is bonded to both the second shelf and the second post to form a rigid joint.

Alternatively, a different design may be arranged. In such a case, a first shelf and a second shelf, both of eggcrate material including vertically extending square apertures, are used. A first post supports the first shelf and holds it horizontal and has a first end which extends from the bottom and a second end which extends to near the first shelf. The first post is joined to the first shelf by a first fitting which is like that already mentioned. However, the first fitting also includes a hole. A second post supports the second shelf and holds it horizontal. The second post has a first end which extends to near the first shelf and a second end which extends to near the second shelf. The second shelf is joined to the second post by a second fitting, which is like that already mentioned. The second post is joined to the first fitting and the second post by a third fitting which has a tapered end which projects into a recess in the first end of the second post, and an interfitting end, which extends into the hole in the first fitting. The various fittings are bonded to the respective parts mentioned to form rigid joints.

In any of the alternative embodiments, the fittings are bonded to the respective parts mentioned by cement. In any of the embodiments which use multiple posts, the first post and second post each have the same length. In any of the embodiments which use multiple shelves, the first shelf and second shelf may have the same shape and size.

BRIEF DESCRIPTION OF THE DRAWINGS

FIG. 5 is an exploded view of the parts forming a joint between first and second posts with the eggcrate shelf sandwiched between the two;

FIG. 6 is an exploded view of an alternative embodiment of the joint of FIG. 5; and FIG. 7 is a partial sectional view of the formed joint using the parts of FIGS. 5 or 6.

DESCRIPTION OF THE PREFERRED EMBODIMENT

In constructing the reef suspension apparatus of this invention, the intent is to provide spaced apart shelving to support live rock at desired elevations in an aquarium. This promotes free circulation of water through out the aquarium, which is inherently better to support aquatic life. This is accomplished by using some conventional parts and some parts which are unique. Combining the parts creates a unique combination of elements not previously known in the field.

The conventional parts comprise the aquarium and the circulation system well known in the field. Other conventional elements are screens to support sand filter beds and porous louvered eggcrate structure found in many fluorescent light fixtures.

Louvered eggcrate panels are readily available from many sources and are formed of polystyrene about one-half inch thick. The porous nature of the eggcrate panels is achieved by square recesses passing completely through the panel from one flat surface to the other. The panels are formed by molding and the parting line for the molds require that the recesses taper from one flat surface to the other. That is, a taper is required to allow the molds to separate from the eggcrate after the polystyrene solidifies. Thus, the square openings at one surface of each eggcrate panel are larger than the square openings at the other surface. In assembling the shelving, to be described subsequently, it is preferred that the panel surfaces having the larger squares face downwardly, but it is not required.

It should be noted that tight quality control is not required in the manufacturing of the eggcrate panels because of their intended use and some square openings on the face of a panel may be larger or smaller than others in the same face. The conventional uses for the panels is not such that dimensional control is required. This fact requires certain structural limitations in assembling the shelving of this invention, as will be described subsequently.

Figure 1:
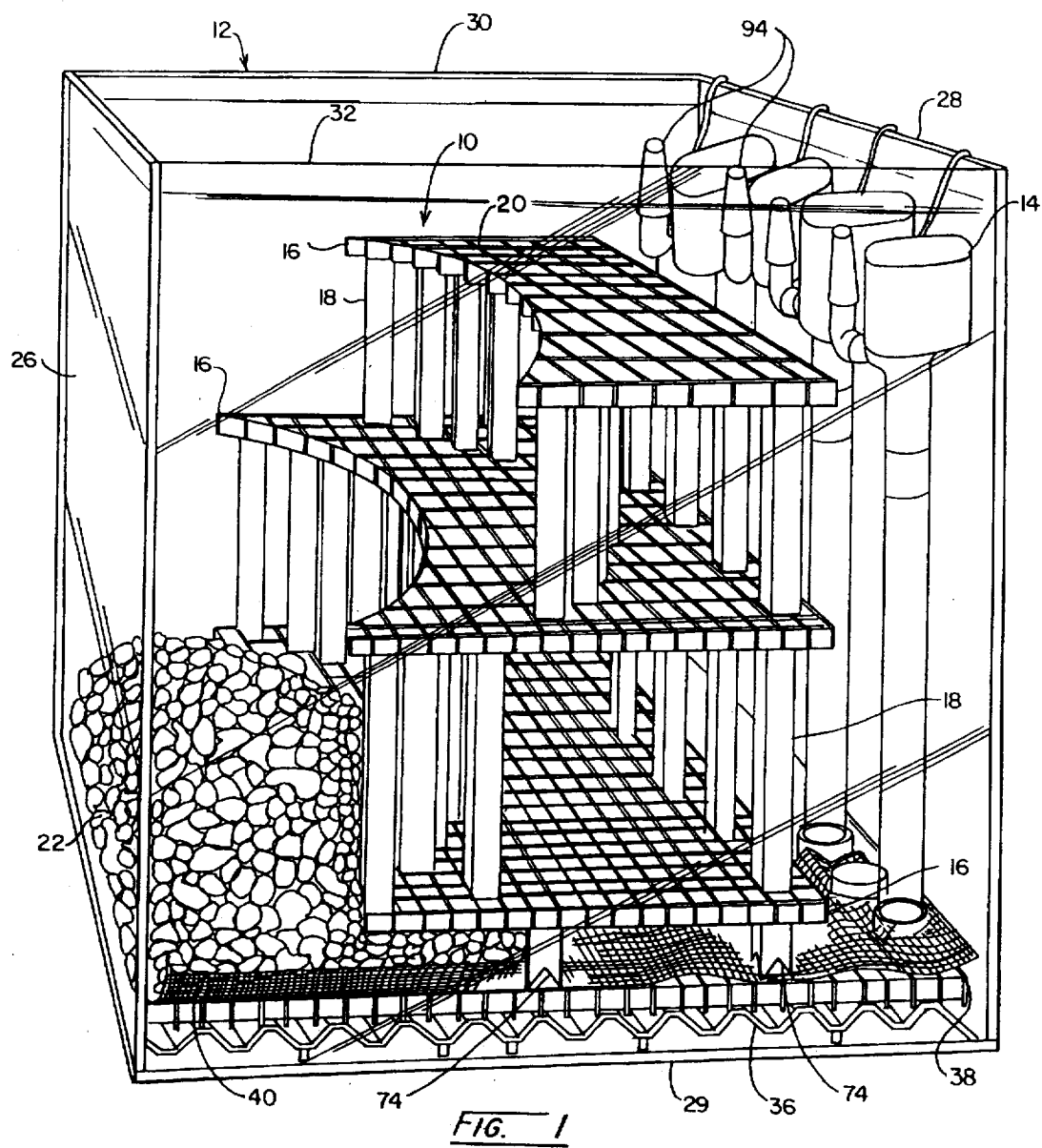
FIG. 1 is a perspective view of an apparatus for suspending a reef in an aquarium in accordance with the present invention.
Figure 2:
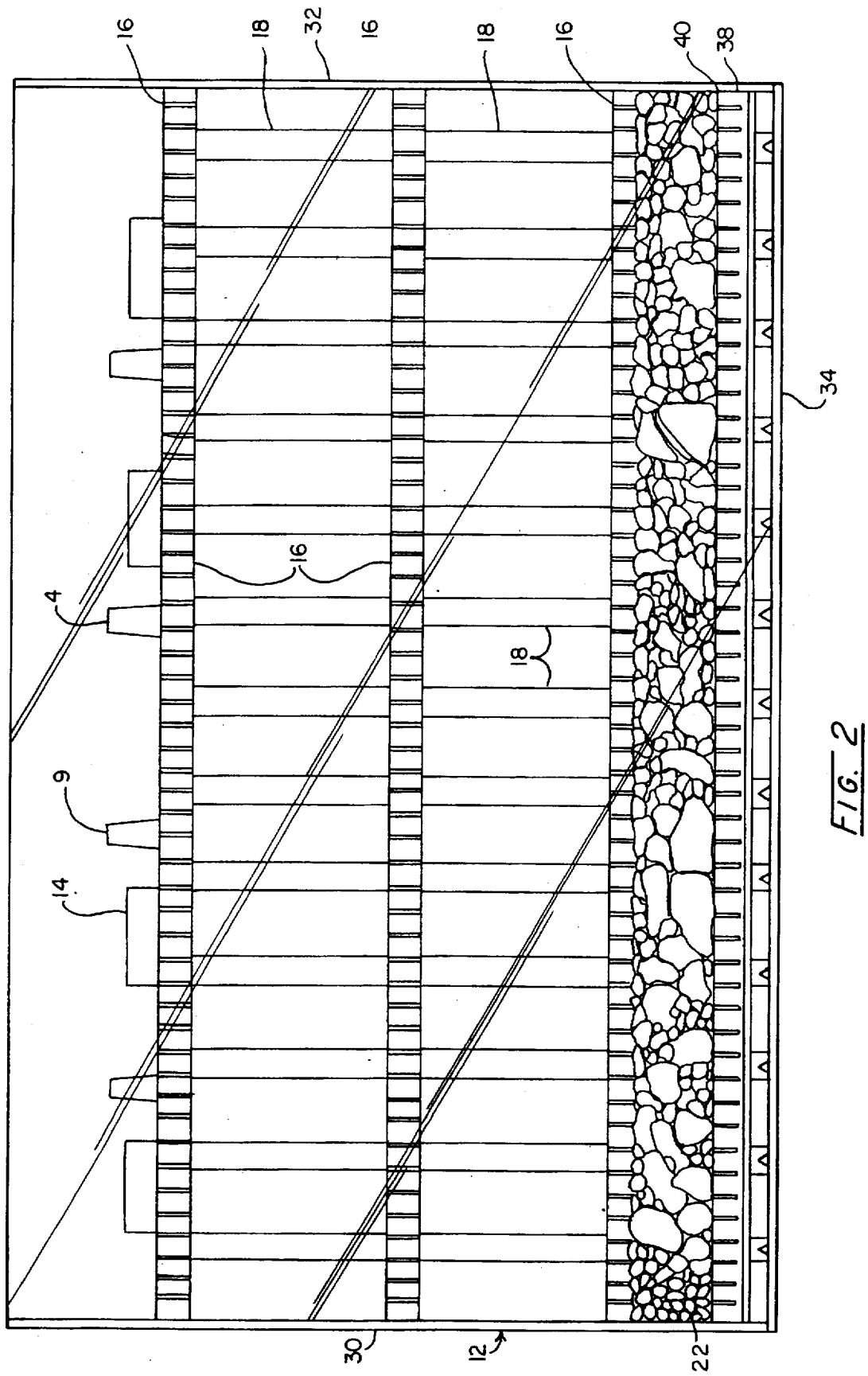
FIG. 2 is a front elevational view of the aquarium and apparatus of FIG. 1.
Figure 3:
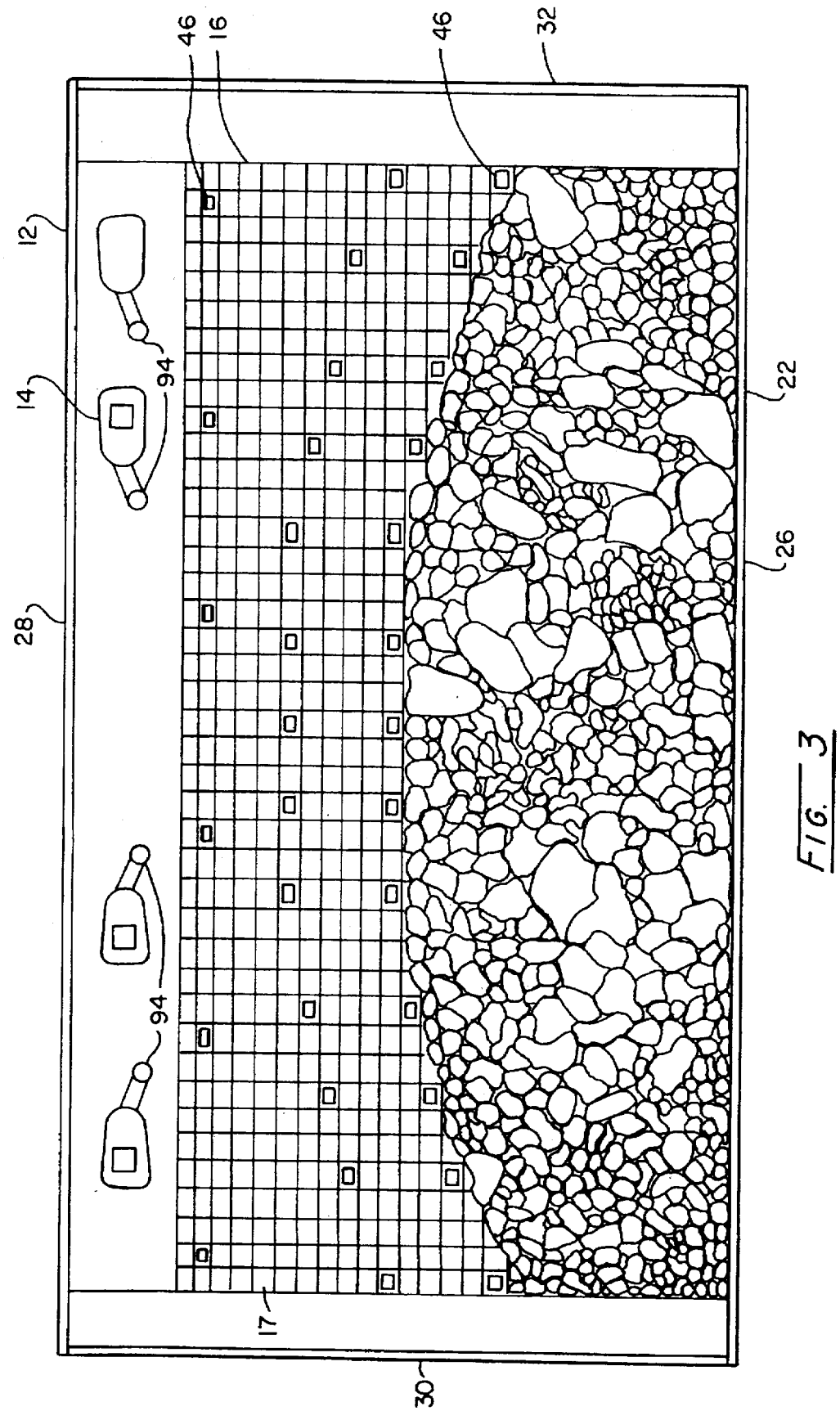
FIG. 3 is top plan view of FIG. 1.

Referring particularly to FIGS. 1–3, a reef suspension apparatus 10 is placed in aquarium 12 with conventional circulation apparatus 14. The reef suspension apparatus 10 includes a plurality of shelves 16 and a plurality of posts 18.

Shelves 16 have a plurality of recesses or apertures 20. The preferred dimensions of apertures 20 is one half inch by one half inch; however, any size may be used. In addition, the panels forming the shelves 16 may be of any size and shape and may differ in size and shape from any other shelf 16 which may be used in the reef suspension apparatus. However, shelves 16 should not be placed or spaced so that they interfere with water circulation or do not allow for the placement of sufficient material in reef bed 22.

Support posts 18 may also be of any size, but should not be so large in cross-sectional area as to interfere with free circulation of the water. Ideally, posts 18 are made of polystyrene and are hollow. It is also preferred that posts 18 have a square cross-section and be three quarters of an inch by three quarters of an inch. However, posts 18 may take any shape. Holes 24 (see FIG. 5) through the sidewalls of the posts are an option to prevent water stagnation.

The aquarium 12 includes a front panel 26, a rear panel 28, a bottom 29 and two side panels 30, 32. Each is joined to a bottom 34 to hold a volume of water. A corrugated sheet 36 rests on bottom 34 and includes a plurality of holes to allow free circulation of water through sheet 36 to the lower inlets of the circulation system 14.

Immediately above sheet 36 is an eggcrate panel 38 which assists in free water circulation and supports a screen 40. Screen 40 is conventional in the aquarium field to support sand and rock while allowing water to flow through without any substantial impediment.

Support posts 18 rest on screen 40 and support the remaining shelving 16 which will be explained subsequently.

Referring particularly to FIGS. 5–7, a first post 18 has a first end 42. First end 42 has a recess 44. A first fastener or fitting 46 is placed in recess 44.

First fitting 46 has three portions, a post end 48 which is of a size and shape to be inserted and fit snugly in recess 44, a panel end 50 which is of a size and shape to be inserted and fit snugly in one of the apertures 20 in panel 16, and middle section or flange 52 to prevent fastener 46 from slipping completely into either aperture 20 or post 18. Panel end 50 is tapered slightly for ease of insertion into aperture 20. Similarly, post end 48 is also tapered. In addition to easing insertion of the fitting 46 into the mating recesses and apertures, both ends 48 and 50 must be tapered to allow easy extraction from the molds where they are formed.

It should be apparent to one of ordinary skill in the art that once first fitting 46 has been inserted in an aperture 20, no other fitting like first fitting 46 may be inserted into the same aperture 20 from the opposite face of the shelf. Therefore, a different fitting must be used on any second post 54 if it is desired that first post 18 and second post 54 be collinear. In order to allow an additional fitting to be placed in the same aperture 20 as first fitting 46, the panel end 50 of first fitting 46 should be hollow and should include a hole 56 to permit insertion of another fitting 62.

Second post 54 has a first end 58 which includes a first recess 60. Third fitting 62 has three parts, a tapered post end 64 which is of a size and shape to fit snugly in first recess 60 of second post 54, an interfitting end 66 which is of a size and shape to be inserted and fit snugly in the hole 56 in the panel end 50 of first fitting 46, and a flange 68 which prevents fitting 62 from slipping through either second post 54 or aperture 20.

It will be obvious to one with ordinary skill in the art that if first post 18 and second post 54 are not to be collinear, but are instead to be slightly off set, i.e., to be fastened in different apertures 20, the third fitting 62 need not be used. In such a case a first fitting 46 would be placed in first opening 60 of second post 54 and frame end 50 of first fitting 46 would be placed in a different aperture 20. It will also be obvious to one with ordinary skill in the art that each of posts 18, 54 has a second end with a second recess (not shown) in which may be placed a second fitting (not shown). The second fitting may be either of first fitting 46 or third fitting 62 depending on whether it is to be placed in an aperture 20 which already contains a first fitting 46. In this way other frames 16 may be added.

It is preferred that first fitting 46 and third fitting 62 be secured to posts 18 and 54, to aperture 20 and to each other. Any of a variety of securing means well known in the art can be used. However, it is preferable to use SC-1508 body styrene cement available from AIN Plastics to secure all of the elements together. Finding an adhesive to bond the polystyrene eggcrate panels to posts 18, 54 and fittings 46, 62 formed from other resins may be possible but such is not known to the inventor. Accordingly, the fittings and posts are formed of polystyrene. Such structure must be made specifically because no commercially available posts and fitting as shown and described are known in the field.

Bonding the polystyrene elements together creates a rigid shelving system which is required to support the live rock as intended.

Figure 4:
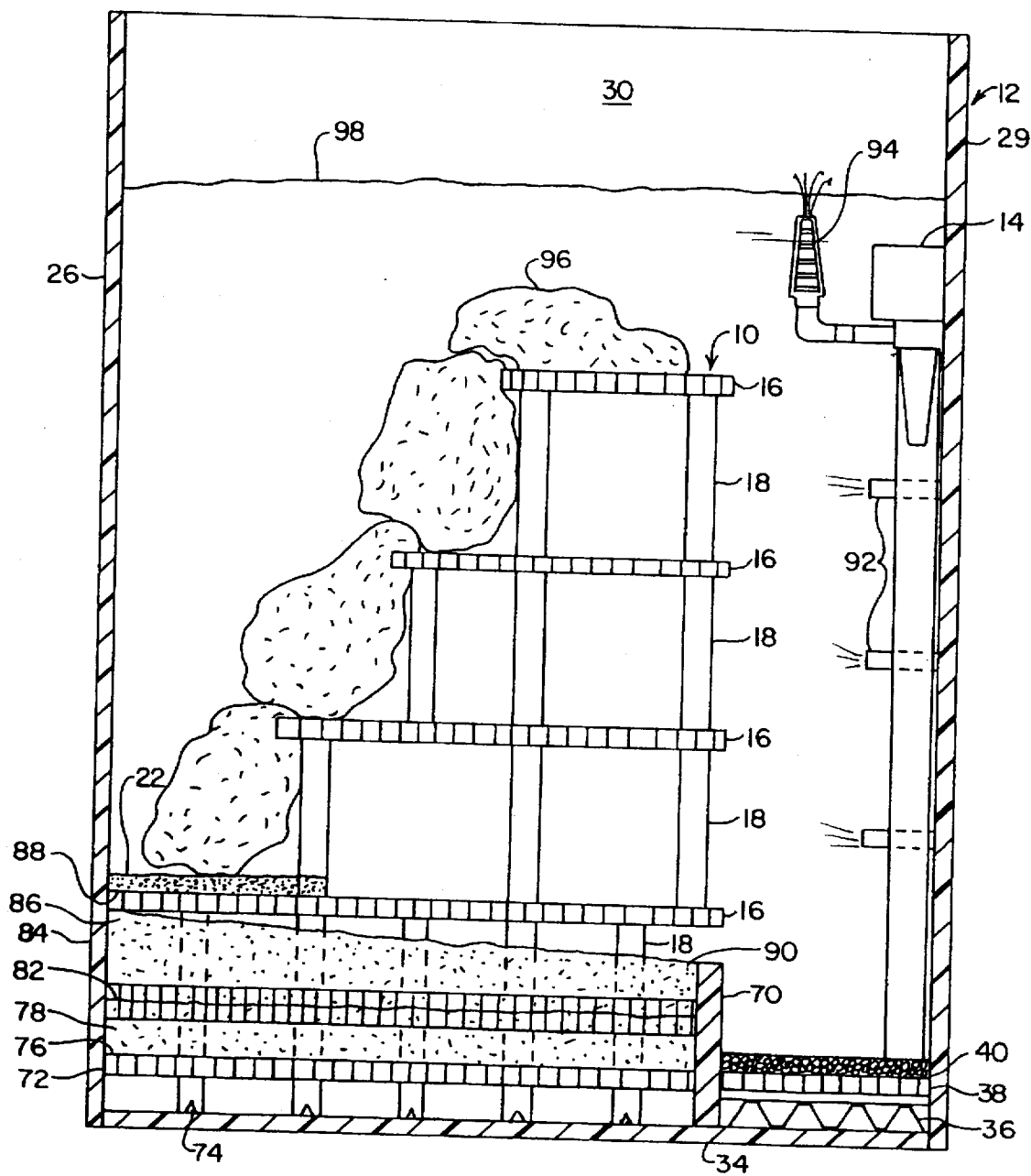
FIG. 4 is a sectional view of an aquarium with shelving for suspending a reef in accordance with the present invention including a reef and a sand filter.

Turning now to FIG. 4, the reef suspension apparatus 10 is shown as it would appear in use in an actual aquarium. A person building an aquarium begins with a corrugated sheet 36, eggcrate panel 38, and screen 40 as was shown in FIGS. 1-3, but places this portion on bottom 34 only near rear panel 28. A retaining wall 70 is placed vertically in front of the corrugated sheet 36, eggcrate panel 38, and screen 40 structure. In front of retaining wall 70 is placed a lower shelf 72 with a plurality of posts 18 supporting it above bottom 34. Shelf 72 should be sized as to fit snugly against retaining wall 70 and front panel 26. The posts 18 supporting this shelf 72 will include notches 74 to allow for better circulation. A screen 76 is placed on top of the lowermost shelf 72. Another shelf 16 supported by posts 18 is placed on top of lowermost shelf 72 and screen 76. A layer of anoxic sand 78 is then poured through shelf 80 and onto screen 76. A screen 82 is then placed on shelf 80. A second shelf 84 is then placed on screen 82. A series of posts 18 are then inserted in apertures 20 of second shelf 84 to support the lowermost reef shelf 16 from second shelf 84. A layer of live sand 86 is then poured on screen 82. Another screen 88 is placed on top of the lowermost reef shelf 16. A reef bed 22 is then placed on top of screen 88. A stop (not shown) may be provided to retain reef bed 22 in place. An additional screen 90 may also be placed on top of live sand layer 86 to prevent live sand layer 86 from being disturbed from spray jets 92 or circulation jet 94. As many shelves 16 supported by posts 18 and built as described above may be added to form the remainder of reef suspension apparatus 10. Live rocks 96 are then placed on the reef suspension apparatus 10 to form the reef. Any type of conventional material, such as coral, may be used in place of live rocks 96. Other modifications of the Jaubert-style filter system and shapes of the reef will be obvious to one of ordinary skill in the art and are intended to be included within the spirit of the inventive concept. Once the various layers have been installed in the aquarium 12, water 98 may be added to cover reef suspension apparatus 10.

Having best described the invention in its preferred embodiment, modifications will be obvious to those having ordinary skill in the art. It is not intended that the invention be limited by the words used to described the component parts nor the illustrated environment of the drawings, rather it is intended that the invention be limited only by the scope of the appended claims.

I claim:

1. An aquarium, comprising:
   a front, a back, sides and a bottom joined together to form an enclosure to hold water;
   a first shelf in said enclosure;
   at least one post supporting said first shelf above said bottom and holding said shelf horizontal, said post having a first end supported by said bottom and a second end extending to near said shelf, said shelf being of louvered eggcrate to allow free circulation of water through the shelf, said eggcrate having a plurality of vertically extending square apertures,
   said first shelf being joined to said at least one post by a first fitting having two tapered ends, one of said tapered ends extending into one of said square apertures, the other of said tapered ends projecting into a recess in said at least one post, said recess in said at least one post being at said second post end, said first fitting being bonded to both said first shelf and said post to form a rigid joint.

2. An aquarium as defined in claim 1, further comprising a second shelf of louvered eggcrate having a plurality of vertically extending square apertures supported above said first shelf by a second post.

3. An aquarium as defined in claim 2, wherein said second shelf is joined to said second post by a second fitting having two tapered ends, one of said tapered ends extending into one of said square apertures of said second shelf, the other of said tapered ends projecting into a recess in said second post, said recess in said second post being at said second end of said second post, said second fitting being bonded to both said second shelf and said second post to form a rigid joint.

4. An aquarium as defined in claim 3, wherein said first post and said second post are of about equal length.

5. An aquarium as defined in claim 3, wherein said second fitting is bonded to said second shelf and said second post by cement.

6. An aquarium as defined in claim 2, wherein said first shelf and said second shelf each have a size and shape, the size and shape of said first shelf being the same as the size and shape of said second shelf.

7. An aquarium as defined in claim 1, wherein said first fitting is bonded to said first shelf and said at least one post by cement.

8. An aquarium, comprising:

a front, a back, sides and a bottom joined together to form an enclosure to hold water;

a first shelf in said enclosure supported by a first post, said first post holding said first shelf horizontal, said first post having a first end supported by said bottom and a second end extending to near said first shelf, said first shelf being of louvered eggcrate to allow free circulation of water through the shelf, said second eggcrate having a plurality of vertically extending square apertures, said first shelf being joined to said first post by a first fitting having two tapered ends, one of said tapered ends extending into one of said square apertures and including a hole, the other of said tapered ends projecting into a recess in said first post, said recess in said first post being at said second end of said first post, said first fitting being bonded to both said first shelf and said first post to form a rigid joint;

a second shelf in said enclosure supported by a second post, said second post holding said second shelf horizontal, said second post having a first end extending to near said first shelf and a second end extending to near said second shelf, said second shelf being of louvered eggcrate to allow free circulation of water through the second shelf, said second eggcrate having a plurality of vertically extending square apertures, said second shelf being joined to said second post by a second fitting having two tapered ends, one of said tapered ends of paid second fitting extending into one of said square apertures of said second eggcrate, the other of said tapered ends of said second fitting projecting into a first recess in said second post, said first recess in said second post being at said second end of said second post, said second fitting being bonded to both said second shelf and said second post to form a rigid joint;

said second post being joined to said first fitting by a third fitting having a tapered end and an interfitting end, said tapered end of said third fitting projecting into a second recess in said second post, said second recess in said second post being at said first end of said second post, said interfitting end extending into said hole in said first fitting, said third fitting being bonded to both said second post and said first fitting to form a rigid joint.

9. An aquarium as defined in claim 8, wherein said first post and said second post are of about equal length.

10. An aquarium as defined in claim 8, wherein said first fitting is bonded to said first shelf and said first post by cement, said second fitting is bonded to said second shelf and said second post by cement and said third fitting is bonded to said first fitting and said second post by cement.

11. An aquarium as defined in claim 8, wherein said first shelf and said second shelf each have a size and a shape, the size and shape of said first shelf being the same as the size and shape of said second shelf.

12. A shelving unit, comprising:

a first shelf and a second shelf of louvered eggcrate, said eggcrate having a plurality of vertically extending square apertures;

at least one post supporting said second shelf above said first shelf and holding said second shelf horizontal, said post having a first end extending to near said first shelf and a second end extending to near said second shelf;

a first fitting between said first shelf and said post, said first fitting having two tapered ends, one of said tapered ends extending into one of said square apertures in said first shelf, the other of said tapered ends projecting into a recess in said first end of said post, said first fitting being bonded to said first shelf and said post to form a rigid joint; and a second fitting between said second shelf and said post, said second fitting having two tapered ends, one of said tapered ends of said second fitting extending into one of said square apertures in said second shelf, the other of said tapered ends of said second fitting projecting into a recess in said second end of said post, said second fitting being bonded to said second shelf and said post to form a rigid joint.

13. The shelving unit as defined in claim 12, wherein said second fitting includes a hole, said tapered end of said second fitting projecting into said one of said squares in said second shelf.

14. The shelving unit as defined in claim 13, further comprising a third fitting between said second shelf and a second post, said second post having a first end and a second end, said third fitting having a tapered end and an interfitting end, said tapered end of said third fitting projecting into a recess in said first end of said second post, said interfitting end extending into said hole in said second fitting, said third fitting being bonded to both said second post and said first fitting to form a rigid joint.

15. The shelving unit as defined in claim 14, further comprising a third shelf above said second shelf and a fourth fitting between said third shelf and said second post, said third shelf being of louvered eggcrate, said eggcrate having a plurality of vertically extending square apertures, said fourth fitting having two tapered ends, one of said tapered ends of said fourth fitting extending into one of said square apertures in said third shelf, the other of said tapered ends of said fourth fitting projecting into a recess in said second end of said second post, said fourth fitting being bonded to said third shelf and said second post to form a rigid joint.

16. The shelving unit as defined in claim 15, wherein said fourth fitting is bonded to said third shelf and said second post by cement.

17. The shelving unit as defined in claim 14, wherein said third fitting is bonded to said second fitting and said second post by cement.

18. The shelving unit as defined in claim 14, wherein said first post and said second post are equal in length.

19. The shelving unit as defined in claim 12, wherein said first fitting is bonded to said first shelf and said post by cement and said second fitting is bonded to said second shelf and said post by cement.

20. The shelving unit as defined in claim 12, wherein said first shelf and said second shelf each have a size and shape, the size and shape of said first shelf being about the same as the size and shape of said second shelf.

* * * * *